(12) United States Patent
Cerea

(10) Patent No.: US 8,172,911 B2
(45) Date of Patent: May 8, 2012

(54) PROCESS FOR THE TREATMENT OF PHOSPHOGYPSUM AND IN PARTICULAR OF PHOSPHOGYPSUM LEACHATES

(75) Inventor: Giuseppina Cerea, Rozzano (IT)

(73) Assignee: Vomm Chemipharma S.r.l., Rozzano (Milano) (IT)

(*) Notice: Subject to any disclaimer, the term of this patent is extended or adjusted under 35 U.S.C. 154(b) by 498 days.

(21) Appl. No.: 12/480,903

(22) Filed: Jun. 9, 2009

(65) Prior Publication Data
US 2009/0306451 A1 Dec. 10, 2009

(30) Foreign Application Priority Data
Jun. 10, 2008 (IT) .............................. MI2008A1051

(51) Int. Cl.
*C01F 5/34* (2006.01)

(52) U.S. Cl. ........................................ 23/304; 23/295 R
(58) Field of Classification Search ................... 23/306, 23/295 R
See application file for complete search history.

(56) References Cited

U.S. PATENT DOCUMENTS 5,173,284 A * 12/1992 Moisset et al. ................ 423/555
* cited by examiner

*Primary Examiner* — Edward Johnson
(74) *Attorney, Agent, or Firm* — Lucas & Mercanti, LLP

(57) ABSTRACT

The present invention describes a process for treating phosphogypsum and in particular the related leachate that comprises the steps of feeding a continuous leachate flow with a dry content of below 5% by weight into a concentration unit heated to a predetermined temperature and equipped with dedicated mixing means, and continuously discharging a concentrated leachate flow having a dry content comprised between 20% and 95% by weight from the concentration unit.

15 Claims, 1 Drawing Sheet

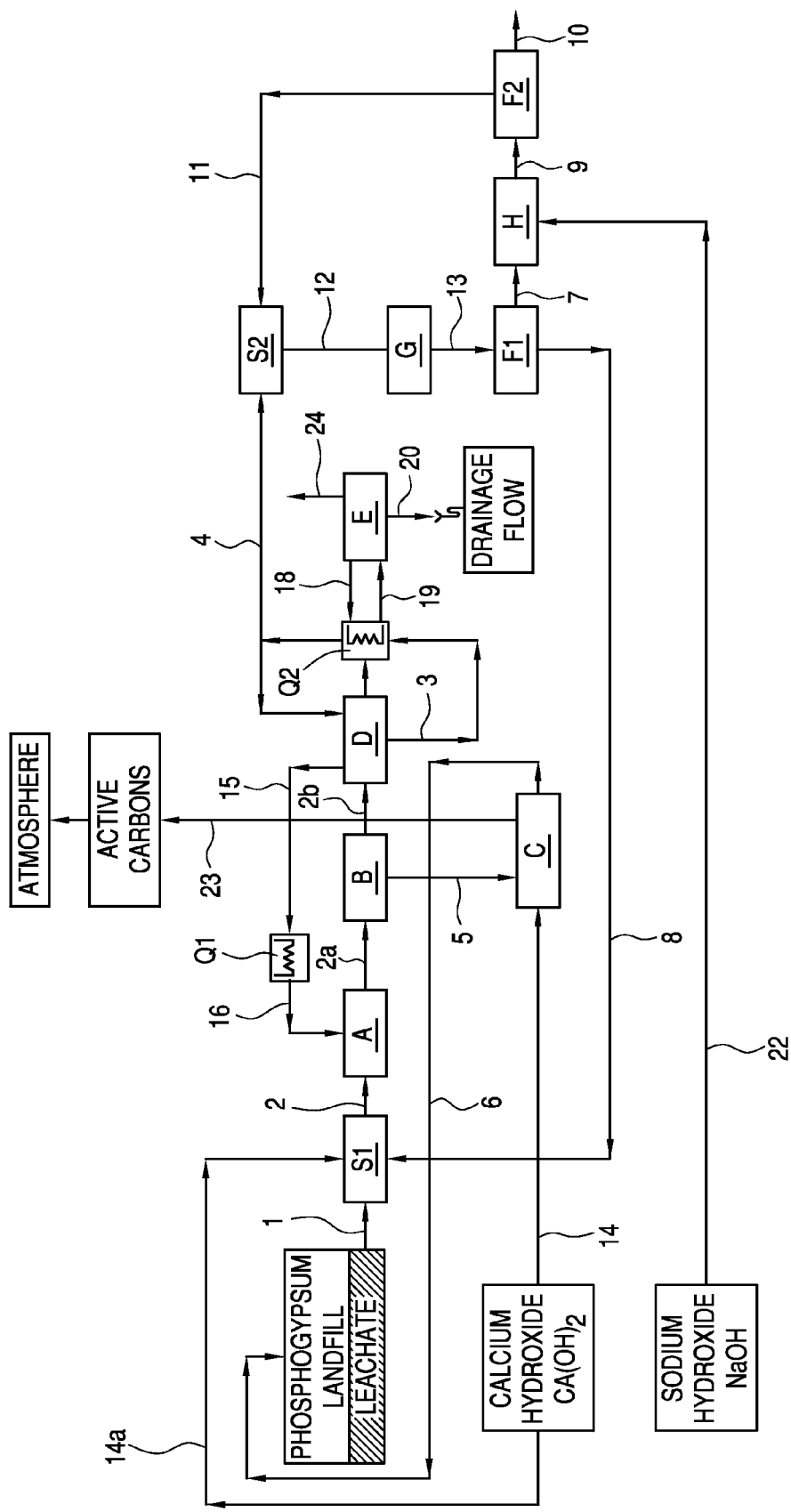

PROCESS FOR THE TREATMENT OF PHOSPHOGYPSUM AND IN PARTICULAR OF PHOSPHOGYPSUM LEACHATES

CROSS-REFERENCE TO RELATED APPLICATIONS

This patent application claims the benefit of priority under 35 U.S.C. §119 of Italian Patent Application No. MI2008A001051 filed Jun. 10, 2008, the contents of which are incorporated herein by reference.

FIELD OF APPLICATION

The present invention concerns the technical field of environmental restoration and in particular it refers to a process for treating phosphogypsum.

More specifically, the invention refers to a process for treating leachate water coming from phosphogypsum landfills.

PRIOR ART

It is known to process phosphate minerals to produce phosphoric acid and fertilizers.

It is also known to use phosphorite (or phosphorites), phosphatic sedimentary rock of organic origin mainly consisting of calcium phosphates as starting mineral, with formation of residues and radioactive processing by-products, like phosphogypsum.

Phosphogypsums (or phosphogypsums), in fact, is a by-product of the processing of phosphorites in practice consisting of gypsum that comprises polluting substances including phosphates, chlorides, sulphates, nitrates and that, moreover, is contaminated by metals such as arsenic, lead, mercury, nickel, copper, cadmium, selenium, hexavalent chromium and also by radionuclides, mainly but not only, uranium 238 ($^{238}U$), polonium 210 ($^{210}Po$), thorium 232 ($^{232}Th$) and potassium 40 ($^{40}K$).

It should also be added that most if not all of the pollutants described above are also present in the leachate that derives from landfills or from phosphogypsum stacks, which, due to the infiltration capability that characterises it, represents an even greater risk to the environment in general, and in particular to groundwater, compared to phosphogypsum itself.

Phosphogypsum as well as the related leachate waters, therefore, constitute a serious environmental problem that the prior art has attempted to solve through various treatment methods and processes, many of which are aimed at reducing their radioactive contamination.

Document U.S. Pat. No. 4,421,731 describes for example a process for reducing the radioactivity of phosphogypsum, comprising an initial thermal calcination step of the phosphogypsum.

Such a process is aimed at the treatment of solid refuse or waste.

For the treatment of leachate coming from phosphogypsum landfills, the prior art has provided processes substantially using membranes that, although meeting the purpose, suffer from the drawback that the treatment on the leachate as such causes rapid soiling of the membranes.

SUMMARY OF THE INVENTION

The aim of the present invention is to provide a process for treating phosphogypsum and in particular the related leachate that is an alternative to the processes provided by the prior art, which is particularly simple and cost-effective, thus involving lower production and management costs of the related treatment plant than those of the known processes quoted above.

Such a aim is accomplished, according to the invention, by a process for treating leachate water coming from a landfill or a phosphogypsum stack that comprises the steps of:

feeding a continuous flow of said leachate having a dry content of below 5% by weight into a concentration unit, heated to a predetermined temperature, and equipped with dedicated mixing means (dynamic concentrator);

continuously discharging a concentrated leachate flow having a dry content comprised between 20% and 95% by weight, preferably greater than 75% by weight, even more preferably comprised between 80% and 95% by weight, from said concentration unit.

Advantageously, said concentration unit can be any heated unit suitable for concentrating the continuous leachate flow, for example a concentrator equipped with an inner wall that can be heated to the aforementioned predetermined temperature, and equipped with dedicated stirring/mixing means that can have rotary or even alternate motion, for example pistons, paddles, blades and similar.

Preferably, said concentration unit is a turbo-concentrator comprising a cylindrical tubular body with horizontal axis equipped with inlet and outlet openings, a heating jacket to bring the inner wall of the tubular body to said predetermined temperature, a bladed rotor rotatably supported in the cylindrical tubular body where it is put in rotation at speeds comprised between 15 and 40 m/s, so as to disperse the continuous leachate flow fed into it in a flow of leachate particles that are centrifuged in particular against the heated inner wall of the turbo-concentrator with formation of a thin, dynamic, highly turbulent tubular fluid layer, which advances substantially in contact with the aforementioned inner wall towards the outlet opening from which the aforementioned concentrated leachate flow is continuously discharged.

It should be noted that the concentrated leachate flow is in the form of a pasty and viscous solid, and it comprises all of the heavy metals present in the initial leachate flow, which have advantageously been concentrated in it.

It should also be noted that the aforementioned concentrated leachate flow substantially consists of gypsum.

In particular, it should be noted that the gypsum obtained from the aforementioned step (nascent gypsum) in which the leachate is concentrated is able to shield the radioactivity that characterises the leachate before it is subjected to the present treatment process.

Therefore, advantageously, the aforementioned concentrated leachate flow can be sent back to the phosphogypsum landfill, possibly after having been subjected to a separation and/or neutralization step.

In detail, preferably, the concentrated leachate flow at the outlet of the concentration unit is fed to a separation unit from which a second concentrated leachate flow is obtained as output in the form of a highly viscous pasty solid that is sent back to the phosphogypsum landfill, possibly after having been subjected to the aforementioned neutralization step in a suitable reactor.

Preferably, in the case of neutralization, such a step is carried out in a turbo-reactor in which the aforementioned concentrated leachate flow (at the outlet of the concentration unit or at the outlet of the separation unit) is made to react with calcium hydroxide $Ca(OH)_2$.

It should also be noted that from the aforementioned separation unit, which is preferably of the type of a hydrocyclone, a further flow, or vaporised leachate flow, is also obtained in output, which preferably, after having been condensed, is subjected to further process steps comprising at least one reverse osmosis step, preferably two reverse osmosis steps.

Preferably still, the aforementioned reverse osmosis steps are preceded by a filtration step of the condensed leachate flow, advantageously carried out with active carbons, and preferably such two reverse osmosis steps are separated by a neutralization step, advantageously carried out with soda (sodium hydroxide—NaOH).

In this way a permeated leachate flow essentially free of pollutants is obtained, or in any case a permeated leachate in which the harmful and/or polluting compounds and elements are present in very low percentages, to the point that the final permeated leachate obtained has characteristics compliant with what is foreseen in Italian legislative decree 152/06 and, therefore, it can advantageously be used as industrial water.

From the aforementioned condensed leachate flow subjected to the aforementioned first reverse osmosis step, a further concentrated leachate flow (third concentrated leachate flow) is also obtained which is advantageously conveyed upstream of the concentration unit to be reintroduced into the purification process at the start of the plant according to the present invention.

In this way a closed circuit process is advantageously obtained.

Further advantages and characteristics of this invention shall become clearer from the description of an example embodiment of a process according to the invention, made hereafter with reference to the attached drawing, provided for illustrating and not limiting purposes.

BRIEF DESCRIPTION OF THE DRAWING

FIG. 1 illustrates a flow diagram that schematically represents a process for treating a leachate flow coming from phosphogypsum landfills in accordance with the present invention.

DETAILED DESCRIPTION

With reference to FIG. 1, a process for treating leachate water coming from phosphogypsum landfills in accordance with the invention is now described in greater detail.

The aforementioned leachate water comprises numerous pollutants and contaminants, generally including phosphates, chlorides, sulphates, nitrates, as well as metals like arsenic, lead, mercury, nickel, copper, cadmium, selenium, hexavalent chromium and radionuclides like uranium 238 ($^{238}$U), polonium 210 ($^{210}$Po), thorium 232 ($^{232}$Th) and potassium 40 ($^{40}$K).

In a running condition, a leachate water flow indicated with 2, also identified here as leachate, is sent to a first apparatus, in accordance with the invention a concentration unit or dynamic concentrator A.

The concentration unit A can be any dynamic concentrator that can be heated to a predetermined temperature or temperature range, equipped with dedicated stirring/mixing means that can have rotary or even alternate motion, described hereafter as a non-limiting example with reference to a turbo-concentrator in accordance with a preferred embodiment of the present invention.

In particular, the turbo-concentrator A essentially consists of a cylindrical tubular body, closed at the opposite ends by end walls and coaxially equipped with a heating jacket intended for the flowing of a fluid, for example diathermic oil or steam, to keep the inner wall of the tubular body at a predetermined temperature.

The tubular body is equipped with an inlet opening from which the leachate flow is fed continuously, and with an outlet opening from which a continuous concentrated leachate flow indicated with 2a is discharged.

For contingent technical reasons the turbo-concentrator, just like any other dynamic continuous concentrator used, can of course have more than one inlet and/or outlet opening.

In the tubular body of the turbo-concentrator a bladed rotor is rotatably supported, the blades of which are arranged helically and are oriented to centrifuge and simultaneously convey the leachate fed into it towards the outlet opening.

A motor is provided to activate the bladed rotor at peripheral speeds comprised between 15 and 40 meters per second.

The aforementioned leachate flow fed to the turbo-concentrator A has a solid substance content (dry content) that at 105° C. is estimated to be less than 5% by weight, and is centrifuged by the aforementioned blades of the rotor, upon entry of the leachate flow in the turbo-concentrator A, against the heated inner wall, and is simultaneously conveyed towards the aforementioned outlet opening thanks to the orientation of the blades.

When the leachate, and more precisely the water contained in it, through the centrifuging action carried out by the blades of the rotor, comes into contact with the wall of the tubular body heated to a high temperature, it evaporates instantly.

Moreover, part of the water bound to the particles of solid substance of the leachate, thanks to the high thermal energy yielded by the heated wall of the tubular body and the high kinetic energy imparted by the blades of the rotor, is also expelled in the form of steam from the solid particles of dry substance.

It should be added that the evaporating capability of the turbo-concentrator A is also further increased in the case in which it involves the feeding inside it of a heated gas flow, as shown in the example of FIG. 1 in which a preheated air flow, recirculated in a closed circuit, is indicated with 16.

Such an air flow 16 is fed into the turbo-concentrator A co-currently to the leachate flow, at a temperature preferably comprised between 150 and 300° C.

The temperature of the air flow 16, preferably 250° C., is advantageously reached by making a closed-loop recirculating air flow 15 pass through a dedicated heat exchanger Q1.

As shown in the example of the FIGURE, the closed-loop recirculating air flow 15 comes from a condensation column D arranged further downstream, in which the process flow of leachate is made to condense, as shall become clearer hereafter.

In output from the turbo-concentrator A, after a residence time generally comprised between 20 seconds and 5 minutes (and generally greater in the case in which the concentration unit does not consist of a turbo-concentrator as described above), the aforementioned continuous concentrated leachate flow indicated with 2a is therefore obtained in the form of a viscous pasty solid, having a dry content of at least 20% by weight and a pH$\leqq$4.

What happens, in practice, is that in the concentration step of the leachate that takes place in the concentration unit A and preferably in the turbo-concentrator, thanks to what is described above, gypsum recognized as nascent gypsum is generated, which surprisingly and advantageously has the ability to shield the radioactivity of the radionuclides present in the leachate that characterises the latter before it is subjected to the present process, thanks to the non-saturation of the 3d orbital of calcium.

Therefore, the nascent gypsum that develops in the present process constitutes a product of the process for treating leachate having extremely low if not actually zero environmental impact as it is essentially free from radioactivity.

Moreover, the aforementioned pasty and viscous concentrated leachate flow 2a at the outlet of the turbo-concentrator A, also comprises the heavy metals initially present in the leachate flow, which have advantageously been concentrated in the nascent gypsum.

As stated earlier, the concentrated leachate flow 2a is then sent back to the phosphogypsum landfill possibly after having been subjected to a neutralization step and preferably after having been separated from the remaining aqueous component of the process flow by passing it through a separation unit B, preferably consisting of a hydrocyclone.

In detail, according to the preferred embodiment of the invention illustrated in the example of FIG. 1, the concentrated leachate flow 2a in output from the turbo-concentrator A is fed to the aforementioned separation unit B, in output from which a second concentrated leachate flow indicated with 5 is obtained.

Then such a concentrated leachate flow 5 in output from the separation unit B is preferably subjected to the aforementioned neutralization step before being sent back to the phosphogypsum landfill.

The neutralization step of the concentrated leachate is carried out in a reactor C, preferably a turbo-reactor in which the concentrated leachate flow 5 is made to react, for example, with a flow of calcium hydroxide $Ca(OH)_2$, in the example of the FIGURE indicated with 14.

The turbo-reactor C essentially comprises a cylindrical tubular body with horizontal axis that is equipped with at least one opening for the introduction of the concentrated leachate flow 5 and the flow of calcium hydroxide 14, and with at least one discharge opening of the treated flow.

The turbo-reactor C also comprises a heating jacket to bring the inner wall of the tubular body to a predetermined temperature, a bladed rotor totally similar to the bladed rotor of the turbo-concentrator described above, that is, rotatably supported in the cylindrical tubular body where it is put in rotation at speeds comprised between 15 and 40 m/s, so as to disperse the concentrated leachate flow in a concentrated flow of leachate particles.

The flow of calcium hydroxide is fed into the turbo-reactor C preferably co-currently to the concentrated leachate flow that, in accordance with the example of FIG. 1, corresponds to the aforementioned second flow but that, as discussed earlier can also correspond to the aforementioned first concentrated leachate flow in output from the concentration unit.

Then, the concentrated leachate and the calcium hydroxide are centrifuged against the inner wall of the turbo-reactor heated to a temperature of at least 150° C., with formation of a thin, dynamic, highly turbulent tubular fluid layer, in which the concentrated leachate and calcium hydroxide particles are mechanically kept in close contact by the blades of the bladed rotor.

The concentrated leachate and the calcium hydroxide then react in the aforementioned thin layer advancing in the cylindrical tubular body towards the discharge opening, substantially in contact with the inner wall of the turbo-reactor C.

Then, a neutralized leachate flow at pH≈7 is discharged continuously from the turbo-reactor C and sent to the landfill or to the phosphogypsum stack, as shown in the example of FIG. 1 in which such a neutralized leachate flow is indicated with 6.

A flow substantially of air indicated with 23 is also obtained in output from the turbo-reactor C that advantageously is discharged into the atmosphere after having been subjected to a treatment step with active carbons.

It should be noted that a second flow corresponding to a vaporised leachate flow 2b is also obtained in output from the separation unit B, which in accordance with the invention is subjected to further process steps in particular comprising at least one reverse osmosis step.

In detail, preferably, the vaporised leachate flow 2b in output from the separation unit B is condensed in a condensation column D, before being subjected as condensed leachate flow 12 to a double reverse osmosis step of the known type.

In short, a reverse osmosis step is carried out using a membrane that holds back the residual polluting substances present in the leachate flow under process (the solute) preventing it from passing through said membrane and in this way generating a further concentrated leachate flow, whereas, vice-versa, the aqueous fraction of the leachate (the solvent) is allowed to pass, consequently generating a permeated leachate flow.

In greater detail, a condensed leachate flow 3 in output from the condensation column D is subjected to cooling in a heat exchanger Q2 and then a condensed leachate flow 12 is subjected to a filtration step in a filtration unit G.

It should be noted that in the heat exchanger Q2, the condensed leachate flow 3 is placed in heat exchange relationship with the refrigeration water of a refrigeration tower E, having respective refrigeration water flows 18 in output and 19 in input (return flow), as well as drainage flows 20, 24.

The filtration of the condensed leachate flow 12 is preferably carried out with active carbons and a filtered leachate flow 13 is thus obtained in output from the filtration unit, which is sent to the first of the aforementioned reverse osmosis steps.

In particular, from the first reverse osmosis step carried out in a respective reverse osmosis unit F1, a first permeated leachate flow 7 and a further concentrated leachate flow 8 which is sent back upstream of the turbo-concentrator A are obtained.

The first permeated leachate flow 7 is then subjected to the second reverse osmosis step in a related second reverse osmosis unit F2 arranged in series with the aforementioned first reverse osmosis unit F1, in which it arrives after having been subjected to a neutralization step in a dedicated unit H.

In other words, the permeated leachate flow 7 is sent to the neutralization unit H, where it is made to react with a flow 22 preferably of sodium hydroxide (NaOH), from which a neutralized permeated leachate flow 9 is obtained in output that is sent to the second of the aforementioned reverse osmosis steps.

After the second reverse osmosis step a flow of product 10 is obtained essentially consisting of water with characteristics compliant with what is foreseen in Italian legal decree 152/06, and which, therefore, can be advantageously used as industrial water.

In order to maintain continuity in the process according to the invention as described above, a tank S1 for collecting the leachate flow to be treated is provided upstream of the turbo-concentrator or in any case in general upstream of the concentration unit A, in other words between the landfill or the phosphogypsum stack that constitutes the source of a leachate flow as such 1 and the concentration unit in which the aforementioned leachate flow 2 in output from the tank S1 is sent.

Preferably, in order to correct the pH from a value of below 3 that characterises the leachate as such coming from the phosphogypsum landfill, to a value comprised between 3 and 4, the leachate flow subjected to the present process is made to react in the collection tank S1 with a second flow of calcium hydroxide 14a fed into the same tank S1.

A second tank S2 is provided between the condensation column D and the filtration unit G to collect the condensed and cooled leachate, in the example of FIG. 1 the flow indicated with 4.

A flow coming from the second reverse osmosis step, in particular the concentrated flow obtained from such a second reverse osmosis step, in the example of the FIGURE the flow indicated with 11, is preferably also sent into the tank S2.

In output from the collection tank S2 there is therefore the aforementioned condensed leachate flow 12 then sent to the filtration unit G as previously described, which is generated by the mixing of the condensed and cooled leachate flow 4 with the concentrated leachate flow 11 obtained from the second reverse osmosis step.

Without wishing to limit the scope of protection of the present invention, the following numeric example illustrates further details of the present invention and in what way the present process can be actuated in a preferred embodiment.

EXAMPLE

A leachate flow 1 coming from a phosphogypsum landfill is subjected to the treatment process according to the present invention in accordance with what is described and illustrated above in the example of FIG. 1, obtaining a flow of product 10.

In particular, the numeric values of the polluting load and of some process parameters that characterise the leachate flow in the various steps of the process according to the invention, such as flow rate, pH, temperature, amount of suspended solids, etc., are displayed in the following table 1.

It should be noted that for some chemicals the total amount present in the process flow amongst the various steps of the process according to the present invention is shown, like for example for phosphor [Ptot], whereas for nitrogen [N] nitric nitrogen is differentiated from ammoniacal nitrogen.

TABLE 1

| | Flow | | | | | |
|---|---|---|---|---|---|---|
| | 1 | 2 | 3 | 4 | 5 | 6 |
| Component | Leachate as such | Leachate + concentrate 1st osmosis stage | Water + condensate | Condensate post-cooling in collection tank | Concentrated leachate | Concentrate + lime turbo reactor inlet 5 + 14 |
| Flow rate (kg/h) | 6167 | 7300 | 183126 | 7126 | 174 | 209 |
| pH | 2.18 | 3-4 | 3-4 | 3-4 | 3-4 | 7 |
| Temperature (° C.) | 20 | 22 | 55 | 30 | 80 | 25 |
| Suspended solids (mg/kg) | 25 | 23 | <5 | <5 | 900 | 747 |
| Ammoniacal N (mg/kg) | 430 | 364 | 1.90 | 1.90 | 15440 | 12816 |
| Nitric N (mg/kg) | 10 | 10 | 2.90 | 2.90 | 259 | 215 |
| Chlorides (mg/kg) | 3100 | 2855 | 385 | 385 | 55000 | 45655 |
| Fluorides (mg/kg) | 830 | 810 | 180 | 180 | 23600 | 19130 |
| Sulphates (mg/kg) | 3300 | 2788 | 1.60 | 1.60 | 74000 | 61427 |
| Ptot (mg/kg) | 4200 | 3548 | 0.90 | 0.90 | 110000 | 91310 |
| Aluminium (mg/kg) | 25 | 24 | | | 900 | 747 |
| Arsenic (mg/kg) | 0.60 | 0.5 | 0.0055 | 0.0055 | 28 | 23.2 |
| Cadmium (mg/kg) | 3.40 | 2.8 | <0.0055 | <0.0055 | 50 | 41.5 |
| Calcium (mg/kg) | 1130 | 955 | <0.1 | <0.1 | 21000 | 109600 |
| Chromium VI (mg/kg) | <0.02 | 0.02 | <0.02 | <0.02 | <0.5 | <0.5 |
| Iron (mg/kg) | 62 | 52.8 | | | 2236 | 1856 |
| Manganese (mg/kg) | 13 | 11 | | | 469 | 390 |
| Mercury (mg/kg) | <0.002 | <0.002 | <0.002 | <0.002 | <0.1 | <0.1 |
| Res. at 105° C. (%) | 2.50 | | | | 90 | 92 |

| | Flow | | | | | |
|---|---|---|---|---|---|---|
| | 7 | 8 | 9 | 10 | 11 | 12 |
| Component | Permeate from 1st osmosis stage | Concentrate from 1st osmosis stage | Permeate from 1st osmosis stage after neutralization | Permeate from 2nd osmosis stage | Concentrate from 2nd osmosis stage | Inlet to 1st osmosis stage: condensate + concentrate 2nd stage 4 + 11 |
| Flow rate (kg/h) | 6493 | 1133 | 6493.25 | 5993.25 | 500 | 7626 |
| pH | 3-4 | 4-5 | 6.50 | 6.5 | 6 | 3-4 |
| Temperature (° C.) | 30 | 30 | 30 | 30 | 30 | 30 |

TABLE 1-continued

| | | | | | | |
|---|---|---|---|---|---|---|
| Suspended solids (mg/kg) | 1 | 4 | 0.5 | 0.0 | 2 | 4.8 |
| Ammoniacal N (mg/kg) | <0.1 | 6.9 | <0.1 | <0.1 | <0.1 | 1.6 |
| Nitric N (mg/kg) | 0.20 | 11 | 0.20 | <0.1 | 0.8 | 2.6 |
| Chlorides (mg/kg) | 92 | 1900 | 92 | 15 | 900 | 419 |
| Fluorides (mg/kg) | 70 | 704 | 70 | <1.5 | 435 | 210 |
| Sulphates (mg/kg) | <0.1 | 6 | <0.1 | <0.25 | <0.1 | 1.4 |
| Ptot (mg/kg) | 0.70 | 2 | 0.70 | 0.50 | 1.8 | 1 |
| Aluminium (mg/kg) | 0.90 | 20 | 0.90 | <0.20 | 1.4 | 5.1 |
| Arsenic (mg/kg) | 0.005 | 0.005 | 0.005 | <0.01 | 0.005 | 0.005 |
| Cadmium (mg/kg) | <0.005 | <0.005 | <0.005 | <0.005 | <0.005 | <0.005 |
| Calcium (mg/kg) | 1.00 | 6.9 | 1.00 | 0.50 | 3.8 | <0.1 |
| Chromium VI (mg/kg) | 0.02 | 0.02 | 0.02 | <0.005 | 0.02 | <0.02 |
| Iron (mg/kg) | 1.00 | 2.8 | 1.00 | <0.2 | 2.4 | <0.1 |
| Manganese (mg/kg) | 0.30 | 0.75 | 0.30 | <0.05 | 0.8 | <0.1 |
| Mercury (mg/kg) | <0.001 | 0.001 | <0.002 | <0.001 | <0.001 | <0.001 |
| Res. at 105° C. (%) | | | | | | |

| | Flow | | | | | |
|---|---|---|---|---|---|---|
| | 13 | 14 | 15 | 16 | 18 | 19 |
| Component | Inlet to 1st osmosis stage | Lime for neutralization of concentrate | Recirculation air in closed loop | Preheated recirculation air in closed loop | Refrigeration water from tower | Refrigeration water returning to tower |
| Flow rate (kg/h) | 7626 | 35 | 6000 | 6000 | 200,000 | 200,000 |
| pH | 3-4 | | | | | |
| Temperature (° C.) | 30 | 20 | 50 | 250 | 25 | 48.75 |
| Suspended solids (mg/kg) | 2 | | | | | |
| Ammoniacal N (mg/kg) | 1.6 | | | | | |
| Nitric N (mg/kg) | 2.6 | | | | | |
| Chlorides (mg/kg) | 419 | | | | | |
| Fluorides (mg/kg) | 210 | | | | | |
| Sulphates (mg/kg) | 1.4 | | | | | |
| Ptot (mg/kg) | 1 | | | | | |
| Aluminium (mg/kg) | 5.1 | | | | | |
| Arsenic (mg/kg) | 0.005 | | | | | |
| Cadmium (mg/kg) | <0.005 | | | | | |
| Calcium (mg/kg) | 2.30 | | | | | |
| Chromium VI (mg/kg) | <0.02 | | | | | |
| Iron (mg/kg) | 1.4 | | | | | |
| Manganese (mg/kg) | 0.0 | | | | | |
| Mercury (mg/kg) | <0.001 | | | | | |
| Res. at 105° C. (%) | | | | | | |

TABLE 1-continued

| | Flow | | | |
|---|---|---|---|---|
| | 20 | 22 | 23 | 24 |
| Component | Drainage refrigeration tower | Soda at neutralization (osmosis section) | Air at treatment with active carbons | Steam from evaporation tower |
| Flow rate (kg/h) | 9000 | 0.25 | 200 | 9000 |
| pH | | | | |
| Temperature (° C.) | 25 | | 50 | 30 |
| Suspended solids (mg/kg) | | | | |
| Ammoniacal N (mg/kg) | | | 120 | |
| Nitric N (mg/kg) | | | | |
| Chlorides (mg/kg) | | | | |
| Fluorides (mg/kg) | | | 2.3 | |
| Sulphates (mg/kg) | | | | |
| Ptot (mg/kg) | | | | |
| Aluminium (mg/kg) | | | | |
| Arsenic (mg/kg) | | | | |
| Cadmium (mg/kg) | | | | |
| Calcium (mg/kg) | | | | |
| Chromium VI (mg/kg) | | | | |
| Iron (mg/kg) | | | | |
| Manganese (mg/kg) | | | | |
| Mercury (mg/kg) | | | | |
| Res. at 105° C. (%) | | | | |

With regard to the individual apparatuses with which the various process steps that characterise the present process as represented in the aforementioned table 1 are carried out, thus a preferred embodiment of the related actuation plant, it should be added that the concentration step is carried out in a turbo-concentrator A made from special stainless steel alloy AISI 904, equipped with a bladed rotor that is made to rotate at a peripheral speed of about 35 m/s.

The neutralization step of the concentrated leachate flow is carried out in a turbo-reactor C made from special alloy AISI 904 the bladed rotor of which is made to rotate at a preferred peripheral speed of about 15 m/s.

The main advantage of the present invention lies in the possibility of having a method for treating leachate coming from a phosphogypsum landfill that allows to obtain, as process products, a concentrated leachate flow, in practice consisting of nascent gypsum capable of shielding the radioactivity of the leachate coming from the phosphogypsum landfill and that, moreover, also concentrates within the pollutants consisting of heavy metals typical of such a leachate, and a permeated leachate flow in practice consisting of water with characteristics such as to be able to be reused industrially in various processes.

Basically, the present invention makes it possible to reduce, if not actually eliminate, the risk of pollution due to the leachate generated by phosphogypsum, through a process that for the same capacity allows an energy saving compared to known processes, which translates into a lower related cost, and which at the same time is particularly flexible with regard to the process flows, times and temperatures.

Of course, a man skilled in the art can make numerous modifications to the invention described above in its different embodiments, in order to satisfy contingent and specific requirements, all of which fall within the scope of invention, as defined in the following claims.

The invention claimed is:

1. Process for treating leachate coming from a landfill or from a phosphogypsum stack comprising the steps of:
   feeding a continuous flow of said leachate having a dry content of below 5% by weight into a concentration unit, heated to a predetermined temperature, equipped with dedicated stirring/mixing means;
   continuously discharging a concentrated leachate flow having a dry content comprised between 20% and 95% by weight from said concentration unit.

2. Process according to claim 1, wherein said leachate flow has a dry content comprised between 75% and 95% by weight and a pH of less than 4.

3. Process according to claim 1, further comprising the step of feeding said concentrated leachate flow into a separation unit from which a further concentrated leachate flow and a vaporised leachate flow are discharged.

4. Process according to claim 3, wherein said separation unit is a hydrocyclone.

5. Process according to claim 1, wherein said concentrated leachate flow is subjected to a neutralization step.

6. Process according to claim 5 wherein said neutralization step is carried out with calcium hydroxide $Ca(OH)_2$.

7. Process according to claim 1, wherein said concentration unit is a turbo-concentrator comprising a cylindrical tubular body with horizontal axis, equipped with inlet and outlet openings, a heating jacket for bringing the inner wall of the tubular body to a predetermined temperature, a bladed rotor, rotatably supported in the cylindrical tubular body where it is put in rotation at speeds comprised between 15 and 40 m/s so as to disperse said continuous leachate flow in a flow of leachate particles, in which said leachate particles are centrifuged against the heated inner wall of the turbo-concentrator with formation of a thin, dynamic, highly turbulent tubular fluid layer, that advances substantially in contact with said inner wall towards said outlet opening from which said concentrated leachate flow is discharged.

8. Process according to claim 5, wherein said concentration unit is a turbo-concentrator comprising a cylindrical tubular body with horizontal axis, equipped with inlet and outlet openings, a heating jacket for bringing the inner wall of the tubular body to a predetermined temperature, a bladed rotor, rotatably supported in the cylindrical tubular body where it is put in rotation at speeds comprised between 15 and 40 m/s so as to disperse said continuous leachate flow in a flow of leachate particles, in which said leachate particles are centrifuged against the heated inner wall of the turbo-concentrator with formation of a thin, dynamic, highly turbulent tubular fluid layer, that advances substantially in contact with said inner wall towards said outlet opening from which said concentrated leachate flow is discharged.

9. Process according to claim 8, wherein said neutralization step is carried out in a turbo-reactor comprising a cylindrical tubular body with horizontal axis, equipped with at least one inlet opening for the introduction of said concentrated leachate flow, at least one outlet opening for the discharge of a neutralized leachate flow, a heating jacket for bringing the inner wall of the tubular body to a predetermined temperature, a bladed rotor, rotatably supported in the cylindrical tubular body.

10. Process according to claim 1, further comprising the step of feeding said concentrated leachate flow into a separation unit from which a further concentrated leachate flow and a vaporised leachate flow are discharged, in which said concentration unit is a turbo-concentrator comprising a cylindrical tubular body with horizontal axis, equipped with inlet and outlet openings, a heating jacket for bringing the inner wall of the tubular body to a predetermined temperature, a bladed rotor, rotatably supported in the cylindrical tubular body where it is put in rotation at speeds comprised between 15 and 40 m/s so as to disperse said continuous leachate flow in a flow of leachate particles, in which said leachate particles are centrifuged against the heated inner wall of the turbo-concentrator with formation of a thin, dynamic, highly turbulent tubular fluid layer, that advances substantially in contact with said inner wall towards said outlet opening from which said concentrated leachate flow is discharged, said concentrated leachate flow is subjected to a neutralization step, carried out in a turbo-reactor comprising a cylindrical tubular body with horizontal axis, equipped with at least one inlet opening for the introduction of said concentrated leachate flow, at least one outlet opening for the discharge of a neutralized leachate flow, a heating jacket for bringing the inner wall of the tubular body to a predetermined temperature, a bladed rotor, rotatably supported in the cylindrical tubular body, and said vaporised leachate flow is condensed and subsequently subjected to at least one reverse osmosis step.

11. Process according to claim 10, wherein said condensed leachate flow is subjected to two subsequent reverse osmosis steps.

12. Process according to claim 11, wherein between said two reverse osmosis steps a neutralization step is carried out on a first permeated leachate flow.

13. Process according to claim 12, wherein said neutralization step is carried out with sodium hydroxide.

14. Process according to claim 10, wherein said condensed leachate flow is subjected, prior to said at least one reverse osmosis step, to a filtration step.

15. Process according to claim 14, wherein said filtration step is carried out with active carbons.

* * * * *